July 4, 1950     L. COUILLARD     2,513,454
RADIOALTIMETER AMPLIFIER

Filed Feb. 27, 1947     3 Sheets-Sheet 1

Inventor
LOUIS COUILLARD
By Haseltine, Lake & Co.
Agents

July 4, 1950  L. COUILLARD  2,513,454
RADIOALTIMETER AMPLIFIER
Filed Feb. 27, 1947  3 Sheets-Sheet 3

Inventor
LOUIS COUILLARD
By Haseltine, Lake & Co.
Agents

Patented July 4, 1950

2,513,454

UNITED STATES PATENT OFFICE 2,513,454

RADIOALTIMETER AMPLIFIER

Louis Couillard, Paris, France, assignor to Societe Francaise Radio Electrique, a corporation of France Application February 27, 1947, Serial No. 731,194
In France February 13, 1946

Section 1, Public Law 690, August 8, 1946
Patent expires February 13, 1966

3 Claims. (Cl. 179—171)

The present invention relates to radio altimeters working with frequency modulation, employed to indicate the absolute altitude of an aircraft relatively to the ground.

Such apparatus generally comprises:

(a) A transmitter, the frequency of which varies periodically as a function of time.

(b) A receiver which receives, on the one hand, the direct radiation emanating from the transmitter, and on the other hand the indirect radiation provided by reflection from the ground of the wave emitted in the direction of the ground.

By reason of the delay, due to the outgoing and return propagation of the reflected wave, the two waves reach the receiver simultaneously with a frequency difference which increases with the altitude of the aircraft. The interference frequency, due to the detection of these two waves is measured, after suitable amplification, by a frequency meter, which directly indicates the height above the ground.

In order to ensure correct functioning, the characteristics of the amplifier in the receiver must satisfy certain conditions. The frequency modulation of the transmitted wave is always accompanied by an amplitude modulation which constitutes a parasitic wave in the reception, always at a frequency lower than the useful frequency:

(1) The reflected wave, diminishing in amplitude in proportion as the altitude increases, is caused to give the amplifier a characteristic curve which is such that the gain increases with frequency, so as to avoid the jamming resulting from the low-frequency disturbances emanating from the transmitter.

(2) In order to prevent parasitic frequencies higher than the useful frequency, and the harmonics of this frequency, from being amplified more than the useful frequency itself, it is usual to provide a device which is such that the gain ceases to increase, or preferably diminishes, at all frequencies higher than the useful frequency received.

In order to obtain this result, members (such as a valve arranged to function as a variable reactance) are generally employed, such members acting on the cut-off frequency of a filter, for example, controlled by a direct-current voltage proportional to the frequency, and so combined that the more the useful frequency and consequently the control voltage is increased, the more the maximum gain of the amplifier is increased, the maximum of the response curve or the point of this curve at which the gain ceases to increase corresponding to the useful frequency.

However, this arrangement has various disadvantages:

(1) If, during flight at the higher altitudes of the measuring scale of the instrument, the transmitted signal is momentarily suppressed (for example, owing to a vertical turn), the control voltage itself will be suppressed, and the characteristic curve of the amplifier will consequently be adjusted to the point corresponding to the lowest frequency, that is to say, to minimum gain. When the transmission re-starts, the gain may no longer be sufficient to ensure the operation of the instrument and the aircraft will have to come down again to an altitude sufficiently low to regain correct operation.

The same will be the case if the aircraft exceeds the ceiling of the altimeter sufficiently to make it cease to function.

The elimination of this disadvantage generally leads to somewhat complicated devices.

(2) At low altitudes the reflected wave corresponding to the height of the aircraft from the ground is generally accompanied by parasitic waves caused by reflections from various obstacles (hangars, houses, trees, etc.) since the transmitted beam is not directive, the angle of sight of those obstacles, measured from the aircraft with reference to a vertical line, can be high. It is likewise possible that these parasitic waves can be produced at very low altitudes by successive multiple reflections between the ground and the wing of the aircraft.

The frequencies corresponding to all these parasitic reflections being higher than the useful frequency, the result will be an increase in the control voltage, and consequently an exaggeration of the amplification of the parasitic frequencies, involving an altitude reading higher than that which corresponds to the true altitude.

(3) Finally, in the particular case where use is made of a variable-reactance valve, it is difficult to obtain a correct functioning of this valve over an extensive frequency range.

The present invention overcomes the disadvantages hereinbefore referred to, and provides, in particular, simple means for enabling the amplifier to retain its maximum gain even if the transmission is suppressed, and to be adjusted to the characteristic corresponding to the lowest frequency when multiple reflections are in evidence.

The invention also provides means for ensuring correct operation over an extensive range of frequencies.

According to a first feature of the invention, the first two disadvantages hereinbefore mentioned can be eliminated by employing a control voltage which is inversely proportional to the frequency or which, at least, varies inversely with respect to the frequency, according to a suitable law.

Under these conditions, if the transmission be suppressed, the control voltage itself being also suppressed, the amplifier is automatically adjusted to the highest frequency, that is to say, to maximum sensitivity.

Furthermore, in cases of multiple reflection, the amplifier is automatically adjusted on the lowest useful frequency. In fact, the waves several times reflected have an amplitude very much lower than that of the normal waves and the limiter tube of the last stage which strongly limits the voltage makes it possible to obtain a control voltage adjusted on the frequency of the wave normally reflected. This voltage is the highest in absolute value.

The objects of the invention and the invention itself will be better understood from a consideration of the detailed description given below of some embodiment of the invention when taken in connection with the accompanying drawing in which:

Figure 1 illustrates, diagrammatically and by way of non-limitative example, a circuit arrangement which permits of obtaining the control voltage in the more general case where the frequency meter utilizes, at the output end of the amplifier, a valve supplying a rectangular voltage of constant amplitude.

Figure 1:
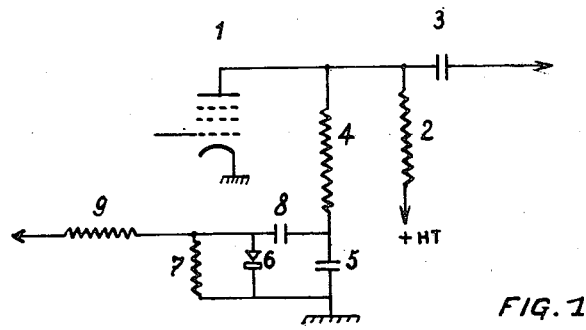
Figure 1 shows a circuit diagram of a valve supplying a rectangular voltage of constant amplitude for obtaining a control voltage in the more general case.

In Figure 1, I designates the valve supplying the rectangular voltage. This tube which performs as the last stage of the amplifier, acts as a limiter. Its control grid is connected by means of a condenser to the output circuit of the preceding stage, the anode of this valve being fed with high tension through the resistance 2. The rectangular voltage is transmitted to the impulse summator of the frequency meter (not shown) by way of the condenser 3.

The device supplying the control voltage comprises a resistance 4 in series with a condenser 5, connected in parallel with the anode circuit of the valve I.

The condenser 5 is charged exponentially during the positive alternations of the rectangular voltage, and is discharged exponentially during the negative alternations. Consequently, there is set up at the terminals of condenser 5 a periodic saw-tooth voltage applied to one of the control grids the amplitude of which varies in inverse ratio to the frequency as a practical example that frequency can be between 150 C. P. S. and 20,000 C. P. S. If the time constant of the system 4—5 is great relatively to the half-period of the rectangular voltage, the amplitude of the voltage developed at the terminals of 5 is, to a very substantial degree, inversely proportional to the frequency.

Finally, a rectifier 6 associated with a charging resistance 7, with a blocking condenser 8 and with a de-coupling resistance 9, supplies the direct-current control voltage. The direction in which the rectifier 6 is connected up is chosen according to the direction or sign of the control voltage to be obtained.

A second feature of the invention consists in employing, with a view to ensuring proper control of the response curve of the amplifier over an extensive frequency range, a counter-reaction amplifier in which the counter-reaction network is so arranged that the gain increases with the frequency throughout the entire frequency range employed when dependent only on this network. The control voltage obtained, for example, by a device similar to that hereinbefore described, is then applied to the amplifier in such a direction that the gain decreases when this voltage increases, that is to say, when the frequency diminishes.

It is known that the overall gain of a counter-reaction amplifier is given by the expression:

$$G = \frac{1}{\frac{1}{A} - B}$$

in which A represents the actual gain of the amplifier without counter-reaction, and B the ratio of the output voltage injected in the input circuit to the voltage of the total output. While B is great with respect to $1/A$, the overall gain G is substantially equal to $1/B$, and the response curve of the whole is the inverse of that of the counter-reaction network. When B is negligible with respect to $1/A$, the gain is substantially equal to A.

If the counter-reaction network is so selected that B is, for example, inversely proportional to the frequency, at all frequencies corresponding to a value of B which is great with respect to $1/A_0$ ($A_0$ being the actual gain of the amplifier in the absence of control voltage), the overall gain will be substantially proportional to the frequency. For higher frequencies, B becomes smaller and smaller with respect to $1/A_0$ and the overall gain will therefore tend towards the limit $A_0$.

Figure 2:
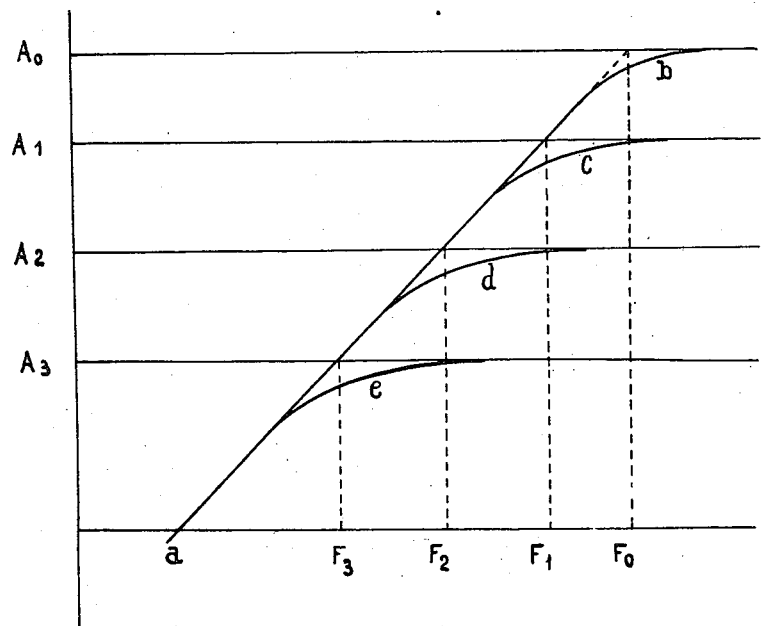
Figure 2 is a graph showing an overall response curve.

The overall response curve is represented at $a, b$ in Figure 2. It will be seen from this figure that for all frequencies lower than a certain frequency $F_0$ the gain is substantially proportional to the frequency, and for all frequencies higher that $F_0$ the gain is substantially equal to $A_0$.

When a reflected wave reaches the receiver, the beat with the direct wave will produce an interference frequency of value $F_1$, for example. This will result in a control voltage giving the actual gain of the amplifier the value $A_1$, and the response curve will be that represented at $a,c$ in Figure 2.

For weaker frequencies, for example $F_2$, $F_3$, the control voltage being higher, the actual gain of the amplifier will assume the valves $A_2$ and $A_3$ respectively, and the corresponding response curves will be $a,d$ and $a,e$ respectively.

The functioning of the device over an extensive range of frequencies necessitates wide variation in the gain of the amplifier. Now, it is possible to obtain such a variation by employing several amplification stages in cascade. If, in fact, $n$ stages are employed, the total variation of gain will be equal to the nth power of the variation of gain of one stage.

According to a third feature of the invention, the functioning of the device hereinbefore described can be further improved and such response curves can be obtained that the gain decreases at frequencies higher than the useful frequency. To this end, the amplifier, considered without counter-reaction, is given a characteristic curve such that its actual gain varies inversely with respect to the frequency.

Figure 3:
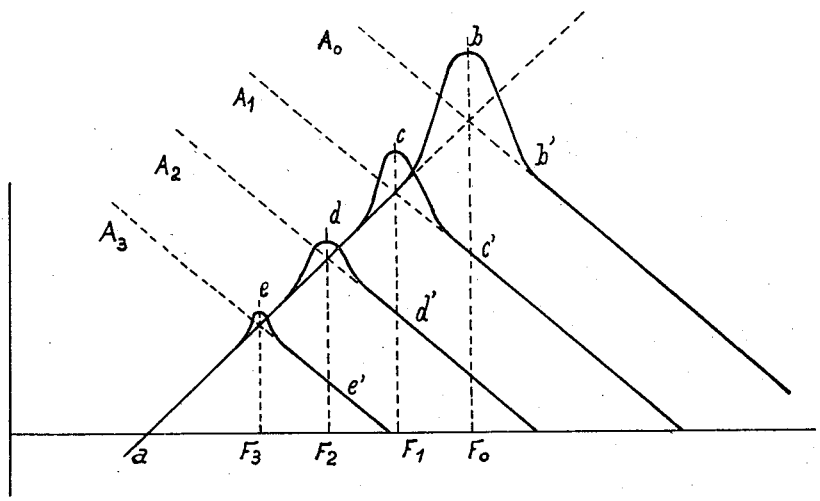
Figure 3 is a similar graph of the case where the gain of the amplifier is without counter reaction and is inversely proportional to frequency.

Figure 3 shows the response curves obtained in the case where the gain of the amplifier without counter-reaction is inversely proportional to the frequency. This gain characteristic is represented by the straight line $A_0b'$ in the absence of control voltage. The overall response curve is then $abb'$. It will be seen that it passes through a maximum at a certain frequency $F_0$.

At other frequencies $F_1$, $F_2$, $F_3$ the corresponding control voltages give the amplifier the characteristic curves $A_1$, $A_2$, $A_3$, to which the overall response curves $acc'$, $add'$ and $aee'$ correspond respectively.

Figure 4:
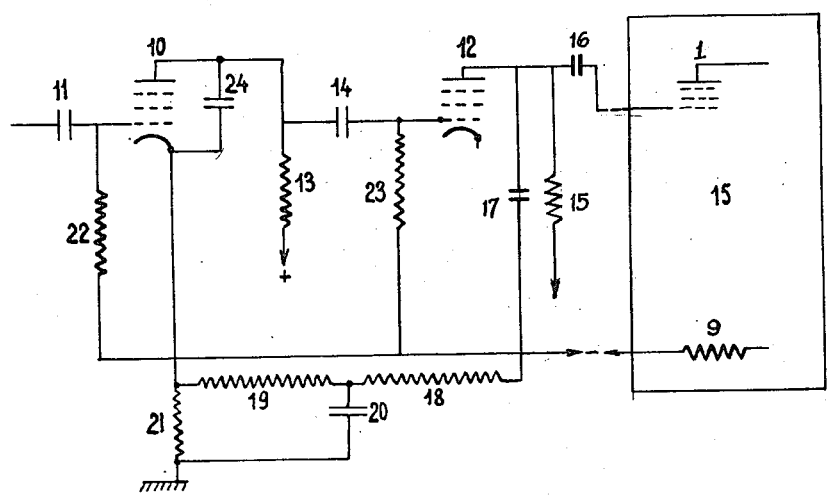
Figure 4 is a circuit diagram of an embodiment of a two-stage amplifier.

Figure 4 shows, by way of non-limitative example, a form of embodiment of a two-stage amplifier according to the invention. In this figure, a first valve 10 receives through the coupling condenser 11 the voltage emanating from the detector stage or, in some cases, from a preceding amplifier stage or stages.

The amplified voltage is applied to a second valve 12 through the charging resistance 13 and the coupling condenser 14.

After further amplification by 12, the voltage is transmitted to the succeeding stages through the charging resistance 15 and coupling condenser 16.

The voltage amplified by 12 is applied, through the blocking condenser 17, to the counter-reaction network comprising the resistances 18 and 19, the condenser 20 and the resistance 21 connected, in the cathode circuit of the valve 10.

This combination of elements constitutes a well-known corrected counter-reaction amplifier circuit arrangement. The elements of the counter-reaction network are so designed as to produce an overall gain characteristic which is proportional to the frequency in the range of frequencies for which $1/B$ is greater than A.

The negative control voltage obtained, for example, by means of a device similar to that hereinbefore described with reference to Figure 1, is applied to the control grids of the valves 10 and 12. This is shown at the right in Figure 4, where the limiter stage according to Figure 1 is brought forward partly in block diagram.

Under these conditions, the operation of the whole arrangement corresponds to that hereinbefore described with reference to Figure 2.

In order to obtain the characteristic curves of Figure 3, there is additionally provided a condenser 24 (Figure 4) connected in parallel with the anode circuit of the valve 10. The gain of the amplifier without feed-back is thus inversely proportional to the frequency as is shown at $A_0$, $A_1$, $A_2$ and $A_3$ in Figure 3, according to the control voltage applied.

The overall functioning is therefore clearly that described with reference to Figure 3.

Furthermore, in order to obtain response curves similar to those of Figure 3, the gain variation of the amplifier must be much greater than in the case of the curves of Figure 2.

In the example in question, in which the gain of the counter-reaction network and the actual gain of the amplifier are inversely proportional to the frequency, the gain variation, expressed in decibels, will have to be twice as great in the case of Figure 3 as in the case of Figure 2.

Such a gain variation may in certain cases be difficult to obtain. Now, the characteristic curve of Figure 3 is above all useful, on the one hand at low frequencies, for eliminating the influence of multiple reflections, and, on the other hand, at high frequencies for reducing background noise.

Another object of the invention, directed to eliminating the difficulty referred to, is to give the actual gain of the amplifier the inverse characteristic curve of the frequency, at the two extremities of the useful frequency range only, or if necessary at one extremity of this range only.

Figure 5:
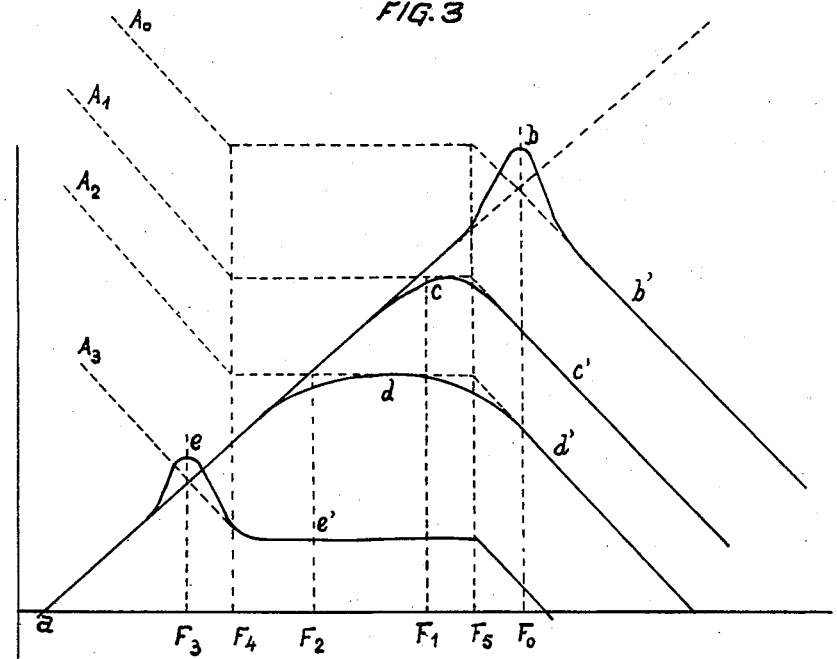
Figure 5 is a graph of response curves where the gain is inversely proportional to frequency only at the two extremities of the range.

Figure 5 shows the form of the response curves obtained in cases where the actual gain of the amplifier is inversely proportional to the frequency at the two extremities of the range only. In this figure, the characteristic curves are designated by the same references as the corresponding characteristics of Figure 3.

Figure 6:
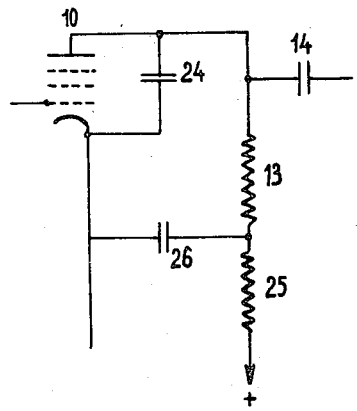
Figure 6 is a circuit diagram of a modification applicable to the amplifier of Figure 4.

Finally, Figure 6 shows, by way of non-limitative example, a modification that may be applied to the amplifier of Figure 4 in order to obtain the characteristic curves of Figure 5.

In Figure 6, in which only a part of the amplifier is illustrated, the same reference numerals designate parts similar to those in Figure 4. In addition, 25 and 26 designate a supplementary resistance and a supplementary condenser, respectively, these being so dimensioned that the actual response curve of the amplifier may be inversely proportional to the frequency through the useful frequency range, at frequencies lower than a certain frequency $F_4$ (Figure 5).

Furthermore, the condenser 24 (Figure 6) is to be so dimensioned that its action only makes itself felt at frequencies higher than a certain frequency $F_5$ (Figure 5), the frequencies $F_4$ and $F_5$ being selected according to the admissible gain variation of the amplifier.

Although the present invention has been described with reference to certain particular embodiments, it is in no way limited thereto, but, on the contrary, numerous modifications and adaptations may be introduced without departing from the scope of the invention.

Thus, for example, the amplifier may comprise more than two stages, or the counter-reaction network may be of a construction other than that illustrated.

Similarly, the actual characteristic of the amplifier, obtained in the example described, by means of the condenser 24, may be obtained by disposing this condenser at any other suitable point, or again, by any other known means, for example by introducing inductance coils at suitable points of the circuits.

Similarly also, it is possible, without departing from the scope of the invention, to take the control voltage from only one part of the charging resistance 7 of Figure 1, or to apply different fractions of the control voltage to the different valves or again, to apply the control voltage only to certain valves of the amplifier, for example, with the object of obtaining a suitable variation of the control voltage as a function of the useful frequency.

I claim:

1. In an aircraft radioaltimeter wherein the transmitted wave is frequency modulated, an amplifier system having an input circuit coupled to receive the beat frequency wave and comprising one or more stages at least one of which is provided with a negative feed-back connection, a later stage which functions as a limiter and is adapted to produce a substantially rectangular wave of said beat frequency, means connected to the output of said limiter stage for transforming said rectangular voltage wave into a continuous voltage whose absolute value varies inversely with said beat frequency, means comprising a control voltage conductor for applying said continuous voltage to the gain control electrode of one at least of the said stages having a feed-back connection whereby the gain of the amplifier system is controlled so that the gain varies inversely with the absolute value of the control voltage.

2. An amplifier system according to claim 1, wherein said later stage comprises in its output circuit, circuit apparatus adapted to provide at its output terminals a continuous control voltage, the absolute value of which is a decreasing function of the incoming beat frequency.

3. An amplifier system according to claim 1, wherein the amplifier comprises three capacity coupled stages, two of said stages being provided with negative feed-back connections, the network of said feed-back connections of said first stage comprising in its input circuit a series resistance and means coupling the same to the output of the second stage comprising a series resistance and a shunt condenser connected across said first mentioned resistance.

LOUIS COUILLARD.

REFERENCES CITED

The following references are of record in the file of this patent:

UNITED STATES PATENTS

| Number | Name | Date |
| --- | --- | --- |
| 2,239,042 | Kleber et al. | Apr. 22, 1941 |
| 2,289,821 | Boucke | July 14, 1942 |
| 2,296,057 | Roberts | Sept. 15, 1942 |
| 2,317,025 | Bond | Apr. 20, 1943 |
| 2,324,797 | Norton | July 20, 1943 |